(12) United States Patent
Larsson

(10) Patent No.: US 6,854,632 B1
(45) Date of Patent: Feb. 15, 2005

(54) WELDING APPARATUS

(75) Inventor: Rolf Larsson, Laxå (SE)

(73) Assignee: Esab, AB (SE)

( * ) Notice: Subject to any disclaimer, the term of this patent is extended or adjusted under 35 U.S.C. 154(b) by 0 days.

(21) Appl. No.: 09/582,003

(22) PCT Filed: Dec. 15, 1998

(86) PCT No.: PCT/SE98/02302

§ 371 (c)(1),
(2), (4) Date: Dec. 2, 2002

(87) PCT Pub. No.: WO99/32254

PCT Pub. Date: Jul. 1, 1999

(30) Foreign Application Priority Data

Dec. 19, 1997 (EP) .............................................. 97850179

(51) Int. Cl.⁷ .......................... B23K 20/12; B23K 37/04
(52) U.S. Cl. ................... 228/2.1; 228/44.3; 219/121.63
(58) Field of Search .............................. 228/212, 112.1, 228/2.1, 175, 44.3; 219/121.63, 121.64

(56) References Cited

U.S. PATENT DOCUMENTS

| | | | |
|---|---|---|---|
| 4,106,167 A | | 8/1978 | Luc |
| 5,484,315 A | * | 1/1996 | Juengst et al. ................ 445/26 |
| 6,045,028 A | * | 4/2000 | Martin et al. ............. 228/112.1 |
| 6,530,513 B2 | * | 3/2003 | Ezumi et al. ............. 228/112.1 |
| 6,585,148 B2 | * | 7/2003 | Aono et al. .............. 228/112.1 |
| 2003/0047584 A1 | * | 3/2003 | Okamoto et al. |
| 2003/0098335 A1 | * | 5/2003 | Saeki et al. |
| 2003/0111515 A1 | * | 6/2003 | Scheglmann et al. |
| 2003/0116608 A1 | * | 6/2003 | Litwinski |

FOREIGN PATENT DOCUMENTS

| | | | |
|---|---|---|---|
| DE | WO 02/07924 A1 | * | 1/2003 |
| EP | 0302954 | | 2/1989 |
| EP | 0423433 | | 4/1991 |
| EP | 0928659 A1 | * | 7/1999 |
| JP | 411179568 A | * | 7/1999 |
| JP | 02000233284 A | * | 8/2000 |
| JP | 02000343250 A | * | 12/2000 |
| JP | 02003062678 A | * | 8/2001 |
| JP | 2002248583 A | * | 9/2002 |
| JP | 02002178169 A | * | 6/2003 |
| SE | WO 97/48517 | * | 12/1997 |
| SE | WO99/32254 | * | 7/1999 |
| SE | WO 99/34951 | * | 7/1999 |
| WO | 9310935 | | 10/1993 |
| WO | 9526254 | | 5/1995 |

OTHER PUBLICATIONS

Derwent–Acc–No: 2002–658045 Kohn (Sep. 26, 2002).*
Jones, G., "ND:YAG Lasers an Introduction To the Technology and Its Applications", Sheet Metal Industries, vol. 72, No. 5, May, 1995, pp. 9–12.

* cited by examiner

Primary Examiner—Kiley Stoner
(74) Attorney, Agent, or Firm—Orum & Roth

(57) ABSTRACT

The invention relates to a welding apparatus comprising a welding unit, a work-table for supporting the workpieces to be welded, and the clamping means for clamping the workpieces to the work-table in the direction towards one another during the welding operation. The welding unit comprises a friction stir welding head and a fusion welding head.

14 Claims, 5 Drawing Sheets

WELDING APPARATUS

The present invention relates to a welding apparatus comprising a welding unit, a work-table for supporting the workpieces to be welded together, and clamping means for clamping the workpieces to the work-table in the direction towards one another during the welding operation.

The welding method chosen to weld the workpieces together depends among other things on the material of the workpieces. When the workpieces are manufactured from aluminium, aluminium alloys, magnesium, magnesium alloys, zinc, zinc alloys or copper, the friction stir welding method is used to an increasing extent. When on the other hand they are manufactured from steel, or stainless steel, fusion welding in the form of laser welding is is used to an increasing extent, particularly in the case of thin workpieces, i.e. having a thickness less than 20 mm The definition friction stir welding designates welding method according to which the workpieces to be joined together are plasticized along their joint line by supply of frictional heat from a rotating welding probe, said probe being supported on a welding head that moves the probe along the joint between the workpieces while at the same time the probe is pressed against the workpieces. As described in WO93/10935 and WO95/26254 the welding probe should be manufactured from a material that is harder than the workpieces, and during the welding operation the workpieces should be securely fixed relative to one another and to the work-table. In this respect this technique differs from that of conventional friction welding according to which the frictional heat is generated by the relative motion of the workpieces as they are being pressed together, i.e. the frictional heat is generated only by the two components to be joined together. The configuration of the welding probe is conditioned e.g. by the material to be welded and by the intended application.

The definition fusion welding as used herein designates a welding method according to which the workpieces to be joined together are fused along their joint line by supply of external energy. Laser welding is a particularly interesting fusion welding technique according to which laser light emitted from a high-energy laser, such as an Nd:YAG laser or a gas laser, causes the fusion. For example welding equipment of the kind described in the article "An introduction to the technology and its applications" in the publication "Sheet Metal Industries" (May 1995) could be used, in which case the laser mounted on a laser head.

Friction stir welding is particularly suitable for welding together aluminium profile sections to produce large aluminium panels, for example of the kind intended for ship hulls. The reason therefor is that this method produces a welded joint the bottom face of which has a smooth and even surface finish with resulting few spots of load concentration. In addition, when this jointing method is used, the strength of the joint is almost equal to that of the basic material. Owing to the considerable forces acting on the workpieces during the welding proper, the requirements are strict, however, as regards work-table stability and the ability of the clamping means to fix the workpieces.

In addition, this welding method can be used only to join together workpieces that are separated by a very narrow air gap. Should the air gap exceed this critical value, a value which among other things depends on the sheet thickness of the profile sections, the resulting welded joint is formed with internal cavities and has impaired strength. As a result, extruded aluminium profile sections, which cannot be produced to exactly precise dimensions by means of current manufacturing methods, need to be subjected to some preparatory treatment in order to avoid too large gaps between the profile sections. This is particularly important when long profile sections are to be joined together, as in this case also small changes in shape may give rise to unacceptable deviations.

Considering that changes in the profile section shape may occur also during the very friction stir welding operation, because the sections are exposed to heat, the dimensions of the end product may fail to be within the acceptable tolerance range, despite the pretreatment of the profile sections. Changes in shape are, however, less serious in the case of MIG and TIG welding, since the temperature never reaches the fusing point.

Another consequence of the critical air gap size is that the workpieces must not move relative to one another, once they are fixed in the correct welding position, i.e. the requirements are strict also on the ability of the clapping means to immobilise the workpieces. Since the welding probe must be in contact with both workpieces during the welding, also the requirements on the running accuracy of the welding head are severe.

In laser welding, on the other hand, it is important that throughout the welding the laser welding head assumes a position midway between the workpiece to be joined together. As a result, severe demands are placed on the running accuracy of the laser welding head. Since the laser beam of a laser welding head is very narrow, the joint, i.e. the air gap between the workpieces prior to welding, must have a width in the range of 0 to 0.5 mm. To ensure that the width of the joint does not exceed the above value it may, just like in the case of friction stir welding, be necessary to treat the workpieces before performing the laser welding. To avoid too large gap widths during the welding operation proper it is of course also important that the workpieces maintained fixed in the same position throughout the welding, i.e. the clamping means must possess satisfactory immoblising ability. In the case of joint widths outside the above range supplementary material must be added to the joint or else the laser welding head be oscillated backwards and forwards across the joint, necessitating more complex and therefore more expensive laser welding equipment.

To satisfy the above criteria it is necessary, both in the case of friction stir welding and fusion welding particularly in laser welding, to use complex and consequently expensive welding apparatuses. This is seen to be a serious problem by those industries that wish to be able to produce high-precision welded joints to weld together workpieces manufactured from aluminium or steel, while using the above welding methods without too heavy investment costs.

The object of the present invention thus is to make it possible for these industries to weld together aluminum as well as steel workpieces while using the above welding methods without utilising complex and consequently expensive welding apparatuses.

This object is achieved in accordance with the teachings of the present invention by means of a welding apparatus of the kind defined in the introduction and which is characterised in that its welding unit comprises both a friction stir welding head and a fusion welding head.

Because the apparatus comprises both a friction stir welding head and a fusion welding head the same work-table and clamping means may be used for both welding methods, a feature which obviously reduces the costs considerably compared with the use of two separate welding apparatuses, which is the only existing possibility today. In view of the particularly severe requirements on running accuracy and stability imposed by laser welding, the invention is especially advantageous inasmuch as the fusion welding is in the form of laser welding, i.e. the fusion welding head is a laser welding head.

The welding apparatus may also comprise a milling unit. Owing to the provision of such a unit it becomes possible to perform milling operations both prior to and/or after each individual welding operation, which ensures that the individual workpieces as well as the resulting product are within the acceptable tolerance ranges without having to be subjected to any external. pre- or post-treatments. The milling operation will make the workpieces sufficiently straight to ensure that the air gaps between them will not exceed the value at which deficient welded joints are produced.

The milling unit may be a milling head which is separate from the friction stir welding head. The milling unit could also consist of the friction stir welding head which is equipped with a milling tool. Finally, the milling unit could consist of a milling head which is separate from the friction stir welding head, and of the friction stir welding head which is equipped with a milling tool. In the latter case it thus becomes possible, in one and the same apparatus, to subject the workpiece edges to be joined together to milling prior to the welding proper and to mill the welded resulting joint after the welding, without using any external pre- or post-treatment unit.

The work-table of the welding apparatus may comprise at least one backing to which each one of the workpieces is clamped by means of a separate clamping means. In accordance with this embodiment, the backing consists of at least two parts which are arranged for movement relative to one another. A workpiece may be clamped in the same position between its associated clamping means and its associate backing part during the milling and the friction stir welding operations. Owing to this arrangement, a high-quality friction stir welded joint is produced. In the case of milling and laser welding, on the other hand, each workpiece could be clamped in the same position between its associated clamping means and its associated backing part. Owing to this arrangement a high-quality laser welded joint is produced.

The invention will be described in closer detail in the following with reference to the accompanying drawings, which for exemplifying purposes show different embodiments of a welding apparatus in accordance with the invention and wherein:

FIGS. 4a and 4c are views corresponding to FIGS. 3a and 3b but showing a second embodiment of the weldin: apparatus whereas

Figure 1:
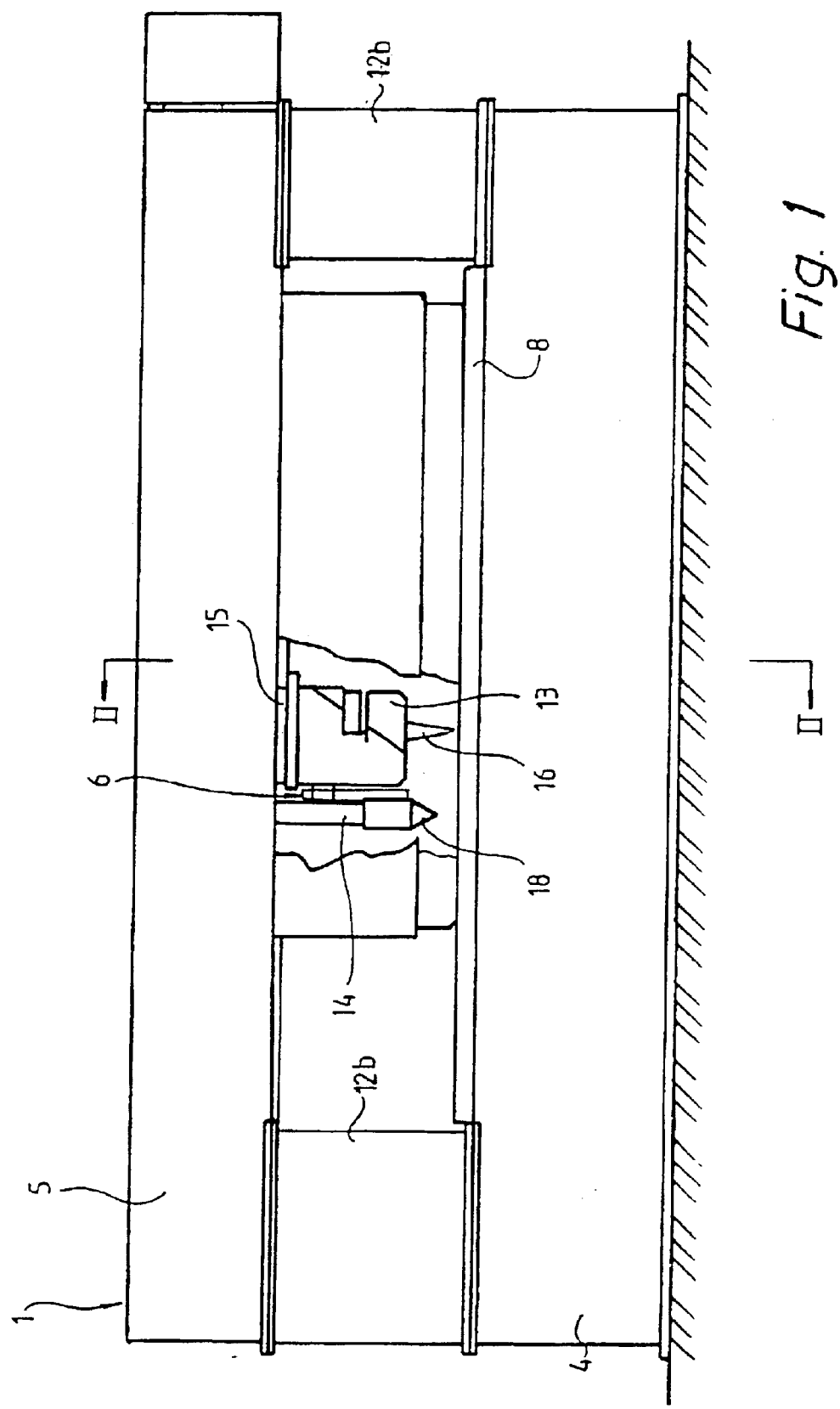
FIG. 1 is a view from the front of a first embodiment of the welding apparatus.
Figure 2:
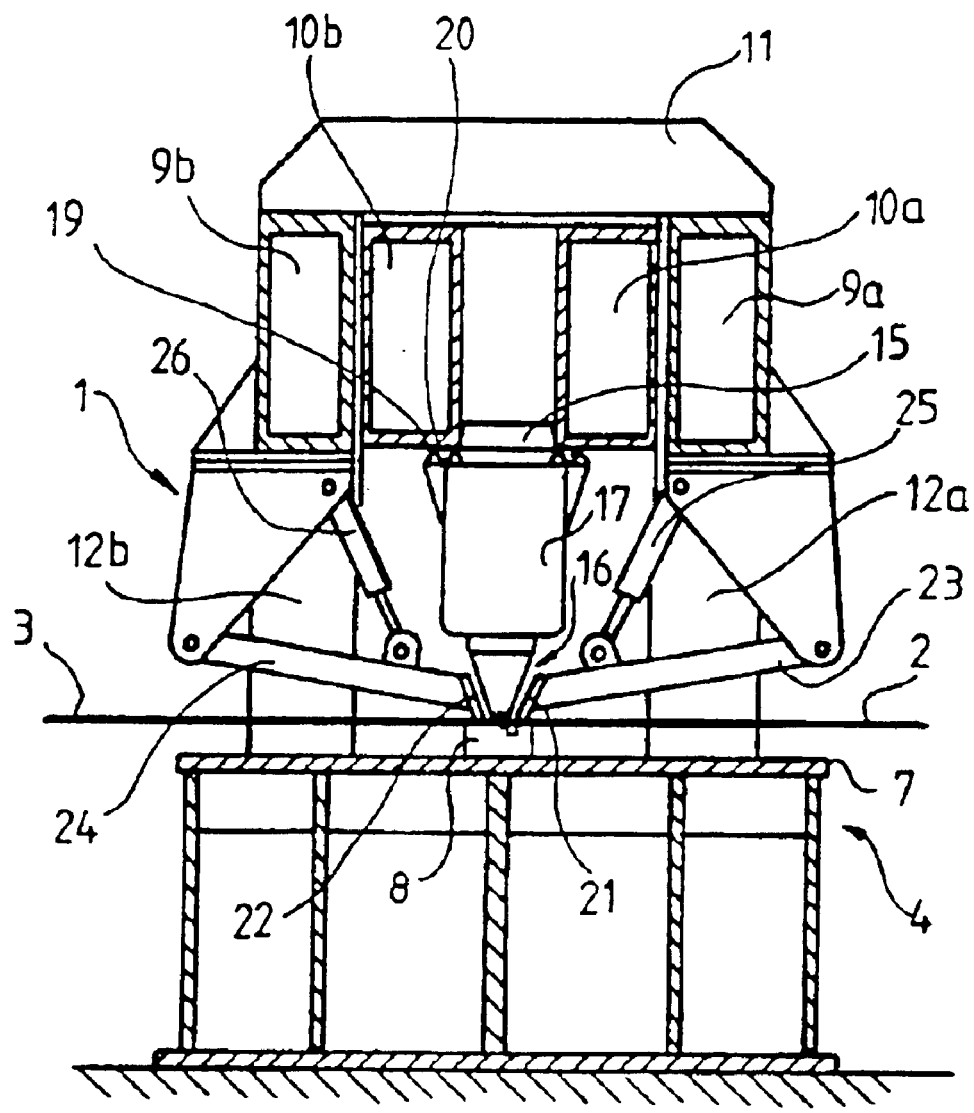
FIG. 2 is a cross-sectional view of the welding apparatus taken along line II—II of FIG. 1.

The welding apparatus 1 illustrated in FIGS 1 and 2 is intended for welding two workpieces 2 and 3 together such as aluminium profile sections or steel plates, to form a intermediate or final product, such as an aluminum of steel panel. The device comprises a work-cable 4, an upper machine frame 5 supported on the work-table, and a welding unit 6. In the subject case the work-table consists of a stationary, stable and horizontal machine table 7 on which a backing a is stationarily mounted. The machine frame 5 consists of an outer pair of beams 9a and 9b and an inner pair of beams 10a and 10b, the beams 10a and 10b of the inner pair being connected to the beams 9a and 1b, respectively, of the outer pair by means of bolt connections, not shown, provided at the respective outer beam ends. The beams 9a and 9b of the outer pair are also interconnected by means of a yoke 11 and rest on the machine table 7 by means of two pillars 12a and 12b each, positioned at the outer ends of the beams.

In this embodiment the welding unit 6 consist of a friction stir welding head 13 and a laser welding heat 14. As appears from FIG. 1, the two heads are mounted on same carriage 15 which is disposed on the inner pair of beams 10a and 10b for movement thereon. The carriage 15 is displaced along the joint line between the workpieces by means of a drive unit, such as a motor, not shown.

Figure 3A:
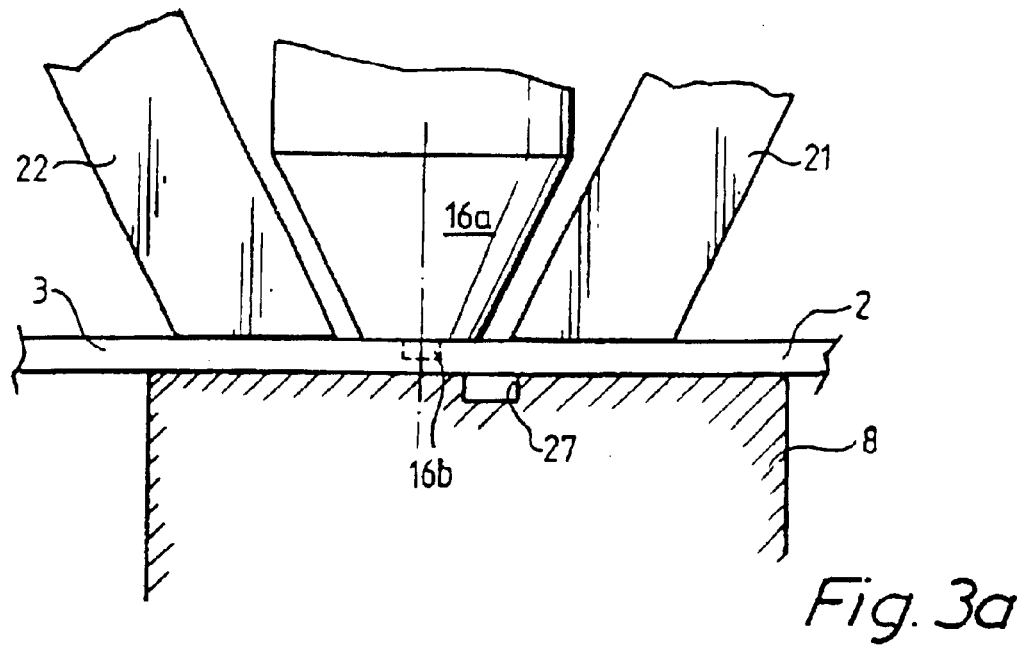
FIGS. 3a and 3b are enlarged fragmentary views of the welding apparatus of FIG. 2, showing the welding apparatus in the friction stir welding position and the laser welding position, respectively.
Figure 3B:
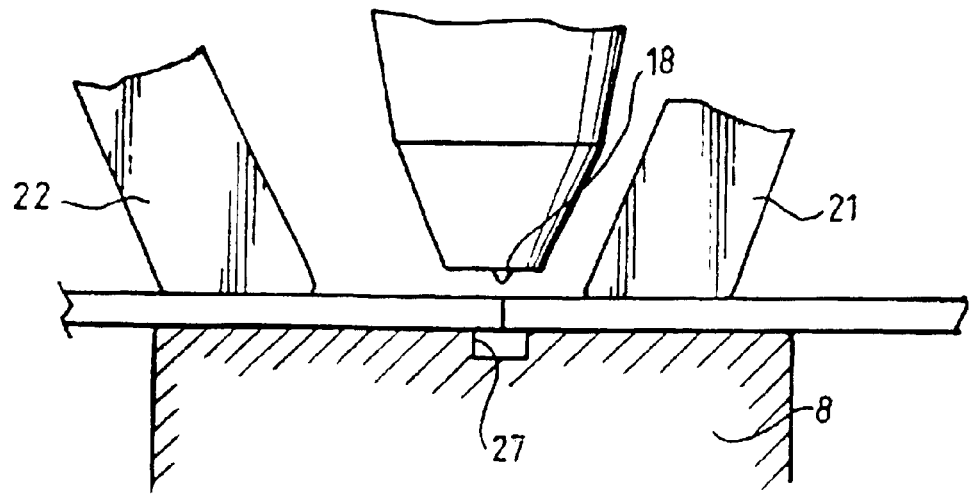

The friction stir welding head 13 is fitted with guide mechanism, not shown, and, as appears from FIGS. 3a and 3b, with a welding probe 16 consisting of a frustroconical body 16a and a pin 16b joined thereto, and during the welding operation, said pin is are positioned between the workpieces in contact with the edges thereof to be joined together. The upper part of the probe body is connected to a rotating spindle 17 which is driven by a drive unit, such asa drive motor, not shown. The body and pin of the welding probe could be configured e.g. in conformity with the erbodiments illustrated in WO93/10935 or in WO95/26254.

Figure 4A:
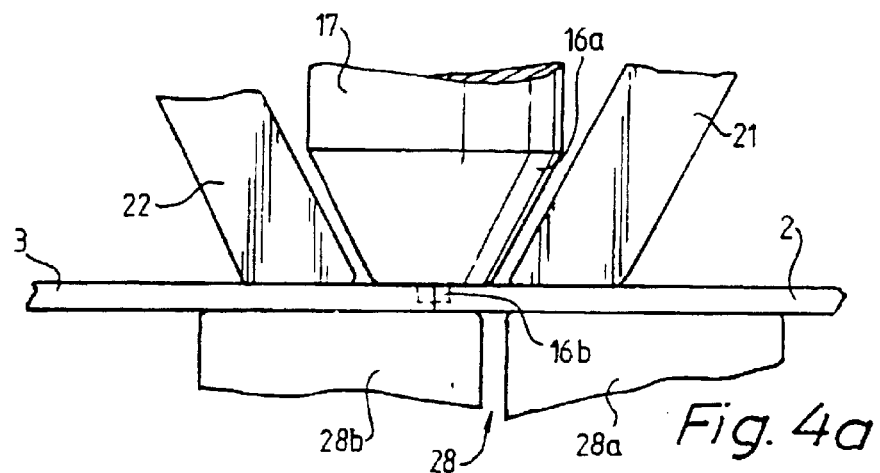
Figure 4B:
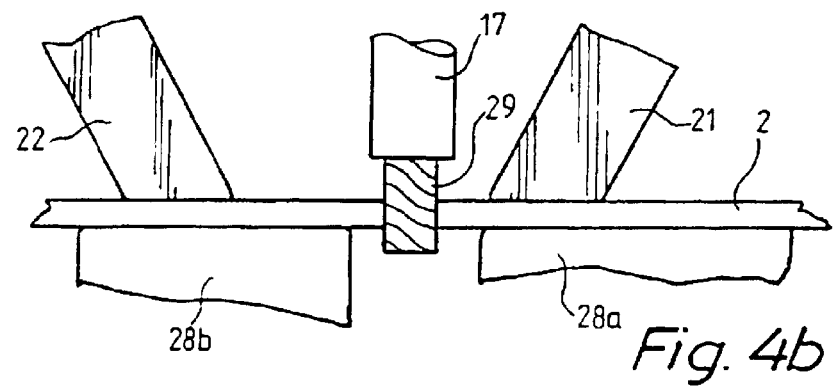
FIG. 4b is a view of the welding apparatus assuming its milling position.
Figure 4C:
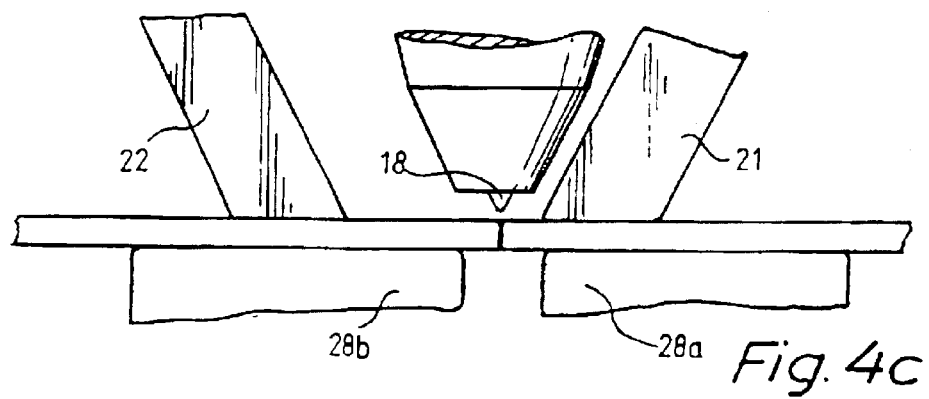

The laser welding head 14 is equipped with a laser unit 18, shown in FIGS. 3b and 4c, and with a joint tracking device, not shown. The laser unit is supplied with laser light from an Nd:YAG laser of the type illustrated in the article "An introduction to the technology and its applications" from the publication "Sheet Metal Industries" (May 1995) and in this embodiment the laser beam source and the laser mirror arrangement are mounted on and inside, respectively, the inner beam 10a.

To ensure that the positions of the welding proble 16 and the laser unit 18, respectively, stay the same in relation to the joint-edges of the workpieces along the entire joint, the carriage 15 is connected with the inner pair of beams 10a and 10b via two guide shoes 19a and 19b, respectively, said shoes travelling along two beam-mounted guide rails 20a and 20b, respectively. This arrangement produces a rectilinear movement relative to the machine frame 5 and the work-table 4.

During welding, the clamping means 21 and 22 press the workpieces 2 and 3, respectively, against the work-table 4 in the direction towards one another. Each clamping means 21 and 22 consists of a triangular pressure member which via arms 23 and 24, respectively, are pressed into engagement with the associated workpiece 2 and 3, respectively, during welding, by means of pressure cylinders 25 and 26, respectively. The pressure cylinders 25 and 26 are connected with the machine frame 5. The clamping means are positioned opposite one another in pairs along the edges of the joint between the work-pieces. According to the present embodiment, the distance between the centre lines of two neighbouring pairs is about 500 mm.

As appears from FIGS. 3a and 3b the backing is formed in accordance with the first embodiment with a groove 27 When the welding apparatus is used for friction stir welding operations, see FIG. 3a, the workpieces 2 and 3 are placed on the backing in such a manner that the joint between them will not be positioned above the groove. This is quite simply due to the fact that in this method, the upper face of the backing functions like a mould that shapes the material that is being plasticized, about the joint line. When the welding apparatus is used for laser welding, see FIG. 3b, the workpiece are so placed on the backing that their edges to be joined together will assume a position straight above the groove. This is quite simply due to the fact that otherwise the workpieces would have been welded to the upper face of the backing during the laser welding.

FIGS. 4a–c, on the other hand, show a two-part backing 28 wherein the upper faces of the parts 28a and 28b, respectively, are plane. In addition, the backing parts are movable relative to one another and according to precisely this embodiment the left-hand part 28b is stationarily mounted on the machine table 7 whereas the right-hand part 28a is movably mounted thereon. In accordance with FIG. 4a, the right-hand part 28a is disposed as close as possible to the left-hand part 28b and in this position only a narrow air gap exists between the parts. In the following, this position will be referred to as the innermost position. According to FIG. 4b, the right-hand backing part assumes a position as far away as possible from the left-hand backing part, and this position will be referred to in the following as the outermost position. In FIG. 4c, finally, the right-hand backing part assumes a position in between the outermost and the innermost positions, and in the following this position will be referred to as the middle position.

When the welding apparatus is to be used for friction stir welding, the joint between the workpieces shall, as pointed out in the aforegoing, be placed on a plane and ungrooved face, i.e. the gap between the backings should be as small as possible and consequently the latter assume their innermost position, see FIG. 4a Since some air gap exists between the backing parts also in this position, the workpiece edges to be joined together additionally must be positioned on the same backing part 28b also during the friction stir welding carried out by means of the welding probe 16.

When, on the other hand, the welding apparatus is to be used for trim milling of the workpieces the friction stir welding probe is replaced in according with this embodiment by a milling tool 29 which thus is supported by the friction stir welding head 13. This becomes possible because a friction stir welding head in principles is configured like a milling head and furthermore possesses sufficient motor power and stability to be able to rotate a milling tool instead of a friction stir welding probe. In order not to damage the upper face of the backing parts, since in the subsequent friction stir welding operation this surface is to serve as a welding joint mould, the backing parts 28a and 28b should in the case be positioned in their outermost position, see FIG. 4b. In this case the milling tool 29 is placed between the workpiece edges to be joined together.

When the welding apparatus is to be used for laser welding, the joint between the workpieces should, as pointed out previously, be positioned above a medium size air gap, i.e. the backings should assume their middle position, see FIG. 4c. In this case the laser unit positioned above the workpiece joint line. In view of fact that satisfactory laser welding in principle always requires subjecting the faces to be welded together to a preparatory treatment of the joint, such as trim milling, the workpieces in principle will always be milled prior to the laser welding. In some cases this is true also in the case of friction stir welding.

As appears from FIGS. 4b and 4c, the clamping means 21 and 22 and the backing parts 28a and 28b, respectively, assume the same positions relative to the workpiece edges to be joined together during both the milling and the laser welding operations. As workpiece 2 is placed on the movable backing part 28a, this workpiece thus will be moved to the left as seen in the drawing figures in order to position the edges to be welded together in contact with one another after milling. Since the workplace 2 is held clamped in the same position during both the milling and the laser welding operations, i.e. is not displaced relative to its backing part after the trim milling step, the resulting welding joint posseses the highest possible precision qualities. The synchronisation of the backing part 28a and the clamping means 21 is obtained by mechanical interconnection means or by means of some other type of synchronising mechanism.

Figure 5:
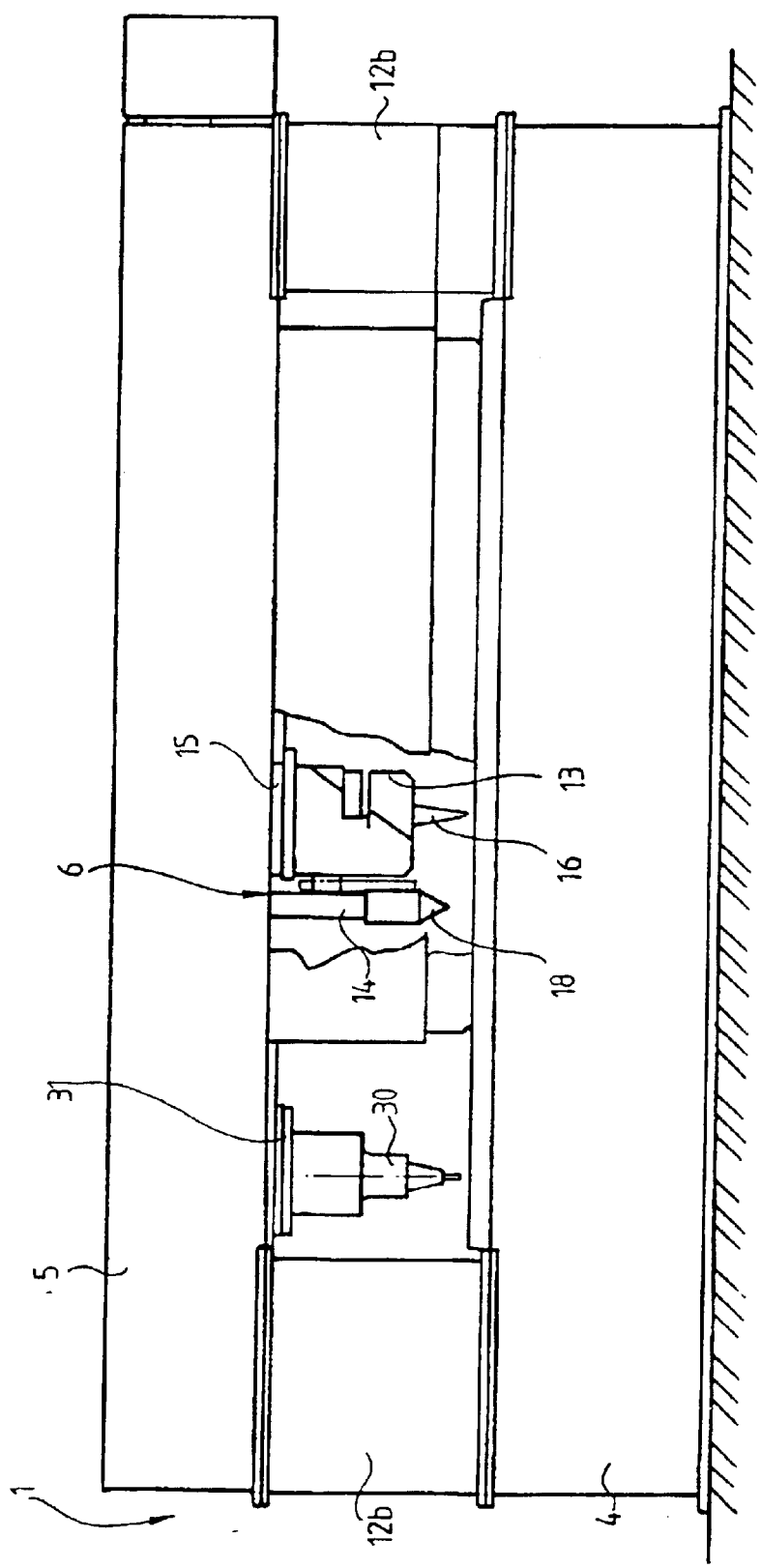
FIG. 5 is a front view of the welding apparatus in accordance with a third embodiment.

FIG. 5, finally, illustrates an embodiment according to which a separate milling head 30 is used, which head is supported by a separate carriage 31 which by means of a drive unit, not shown, may be displaced along th rails 20a and 20b of the inner pair of beams in the manner as carriage 15, see FIG. 7.

When the workpieces 2 and 3 are to be welded together to produce the product to be manufactured, workpieces are clamped in the welding apparatus 1 by means of the clamping means 21 and 22. Depending on the quality of the workpiece edges to be joined together, i.e. on whether they possess an acceptable degree of straightness or not, the workpieces are positioned either in the milling position, see FIG. 4b; or in the welding positions according to FIGS. 4a and 4c. Should the edges be deficient, the workpieces therefore are clamped in the milling position in which their edges to be joined together abut against the outer face of the milling tool 29, and in this case the friction stir welding probe 16 is replaced by the milling tool. The milling operation is then started by rotation of the milling tool at a predetermined speed while at the same time the tool is moved at a predetermined speed along the edges to be joined together.

When the milling has traversed the entire joint and the individual milling operation thus is completed, the pressure cylinders 25 and 26 are activated, allowing the workpieces to be released from the clamping means 21 and 22, if the workpieces, following the milling operation, are to be welded together by means of the friction stir welding technique. By activation of said pressure cylinders, the workpieces 2 and 3 may thereafter be fixed the position shown in FIG. 4a. It is likewise possible to fasten the second workpiece already from the start in such a manner that it may assume the same clamped position during both the milling and the friction stir welding operations, i.e. following the milling step only the left-hand pressure cylinder, 26 need be activated for release and subsequent clamping of the left workpiece 3 The milling tool is thereafter exchanged for the friction stir welding probe, which is caused to rotate at predetermined speed while at the same time being moved alln the gap at a predetermined speed. As explained in the introduction hereto, the workpiece edges to be joined together will be plasticised by the frictional heat generated in this process while at the same time they will be pressed against the work-table. After solidification, a homogeneous welded joint is formed, possessing high-strength qualities. When the friction stir welding probe 16 has traversed the entire joint and the individual welding operation thus is completed, the pressure cylinders 25 and 26 are again activated, causing deactivation of the clamping means 21 and 22, whereby the formed product is released.

If the workpieces are to be welded together by means of the laser welding technique, there is no need to activate the pressure cylinders of the clamping means, when the milling tool has traversed the entire joint and the individual milling operation thus is completed, since both workpieces are clamped in the same position between their associated clamping means and backing parts, respectively, during the milling operation as during the preceding treatment step. The laser unit 18 of the laser welding head 14 is thereafter placed above the joint line of the workpieces, whereupon the laser is activated so as to fuse the joint edges together by supply of lasers light. When the laser unit 16 has traversed the entire joint and the individual welding operation thus is completed, the pressure cylinders 25 and 26 are activated, causing deactivation of the clamping means 21 and 22, whereby the formed product is released.

If the desired product is to comprise more than two workpieces it may be necessary to mill between each welding operation in order to produce a high-quality end product.

It should be appreciated that the invention is not limited to the above embodiments but that numerous modifications are possible within the scope of the appended claims. For example, the welding probe may be exhangeable for the milling tool automatically instead of manually with the aid of a tool switching device. For example, when a separate milling head is used, it is still possible under certain circumstances to exchange the friction stir welding probe 16 of the friction stir welding head 13 for a milling tool, so that milling may be performed prior to as well as after an individual laser welding operation. The separate milling head could of course be positioned upstream from the welding unit as seen in the direction of welding together of the workpieces instead of downstrem therefrom, as illustrated in FIG. 5. In the event the welding apparatus 1 is to be used mostly for fricton stir welding operations, a separate milling head suitably is used, said head being positioned upstream from the friction stir welding head. Instead of arranging the friction stir welding head and the laser welding head on a common carriage, each head may be arranged on a separate carriage, a feature which increases the versatility of the welding apparatus.

What is claimed is:

1. An apparatus (1) for welding, comprising a welding unit (6), a work-table (4) for supporting the workpieces (2, 3) to be welded, and clamping means (21, 22) for clamping the workpieces to the work-table in the direction towards one another during the welding operation, characterized in that the welding unit (6) comprises a friction stir welding head (13) and a fusion welding head (14).

2. An apparatus as claimed in claim 1, characterized in that the fusion welding head is a laser welding head (14).

3. An apparatus as claimed in claim 1, characterized in that it also comprises a milling unit (13, 29; 30).

4. An apparatus as claimed in claim 3, characterized in that the milling unit consists of a milling head (30) which is separate from the friction stir welding head (13).

5. An apparatus as claimed in claim 3, characterized in that the milling unit is formed by the friction stir welding head (13) fitted with a milling tool (29).

6. An apparatus as claimed in claim 3, characterized in that the milling unit consists of a milling head (30) which is separate from the friction stir welding head (13) and of a friction stir welding head (13) fitted with a milling tool (29).

7. An apparatus as claimed in claim 1, wherein the work-table comprises at least one backing (28a, 28b) and each workpiece (2, 3) is clamped to the backing by means of separate clamping means (21, 22), characterized in that the backing consists of at least two parts (28a, 28b) which are arranged for movement relative to one another and in that at least one workplece (2, 3) is clamped in the same position between its clamping means (21, 22) and its associated backing part during milling and friction stir welding operations or milling and laser welding operations.

8. An apparatus as claimed in claim 7, characterized in that each workpiece (2, 3) is damped in the same position between its clamping means (21, 22) and its associated backing part (28a, 28b) during milling and laser welding operations.

9. An apparatus as claimed in claim 2, characterized in that it also comprises a milling unit (13, 29; 30).

10. An apparatus as claimed in claim 2, wherein the work-table comprises at least one backing (28a, 28b) and each workpiece (2, 3) is clamped to the backing by means of a separate clamping means (21, 22), characterized in that the backing consists of at least two parts (28a, 28b) which are arranged for movement relative to one another and in that at least one workpiece (2, 3) is clamped in the same position between its clamping means (21, 22) and its associated backing part during milling and friction stir welding operations or milling and laser welding operations.

11. An apparatus as claimed in claim 3, wherein the work-table comprises at least one backing (28a, 28b) and each workpiece (2, 3) is clamped to the backing by means of a separate clamping means (21, 22), characterized in that the backing consists of at least two parts (28a, 28b) which are arranged for movement relative to one another and in that at least one workpiece (2, 3) is clamped in the same position between its clamping means (21, 22) and its associated backing part during milling and friction stir welding operations or milling and laser welding operations.

12. An apparatus as claimed in claim 4, wherein the work-table comprises at least one backing (28a, 28b) and each workplece (2, 3) is clamped to the backing by means of a separate clamping means (21, 22), characterized in that the backing consists of at least two parts (28a, 28b) which are arranged for movement relative to one another and in that at least one workpiece (2, 3) is clamped in the same position between its clamping means (21, 22) and its associated backing part during milling and friction stir welding operations or milling and laser welding operations.

13. An apparatus as claimed in claim 5, wherein the work-table comprises at least one backing (28a, 28b) and each workpiece (2, 3) is clamped to the backing by means of a separate clamping means (21, 22), characterized in that the backing consists of at least two parts (28a, 28b) which are arranged for movement relative to one another and in that at least one workpiece (2, 3) is clamped in the same position between its clamping means (21, 22) and its associated backing part during milling and friction stir welding operations or milling and laser welding operations.

14. An apparatus as claimed in claim 6, wherein the work-table comprises at least one backing (28a, 28b) and each workpiece (2, 3) is clamped to the backing by means of a separate clamping means (21, 22), characterized in that the backing consists of at least two parts (28a, 28b) which are arranged for movement relative to one another and in that at least one workpiece (2, 3) is clamped in the same position between its clamping means (21, 22) and its associated backing part during milling and friction stir welding operations or milling and laser welding operations.

* * * * *